G. Paddington,
Corn Planter.
No. 87,426. Patented Mar. 2, 1869.
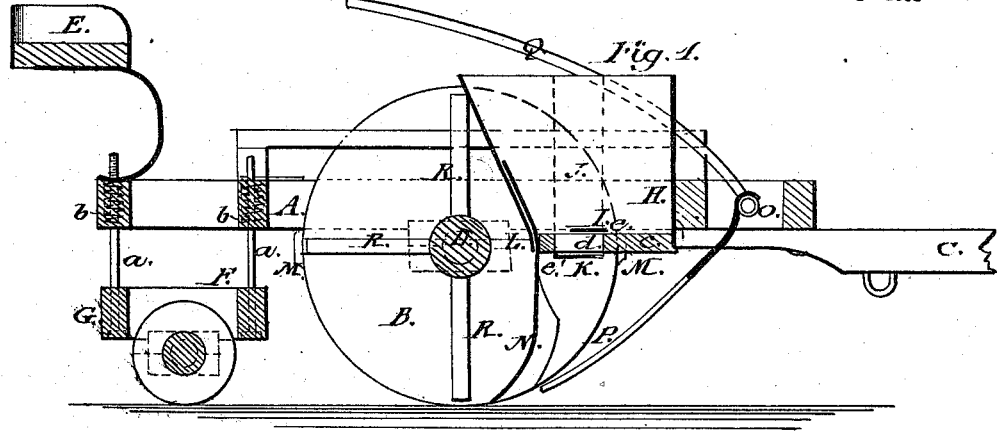
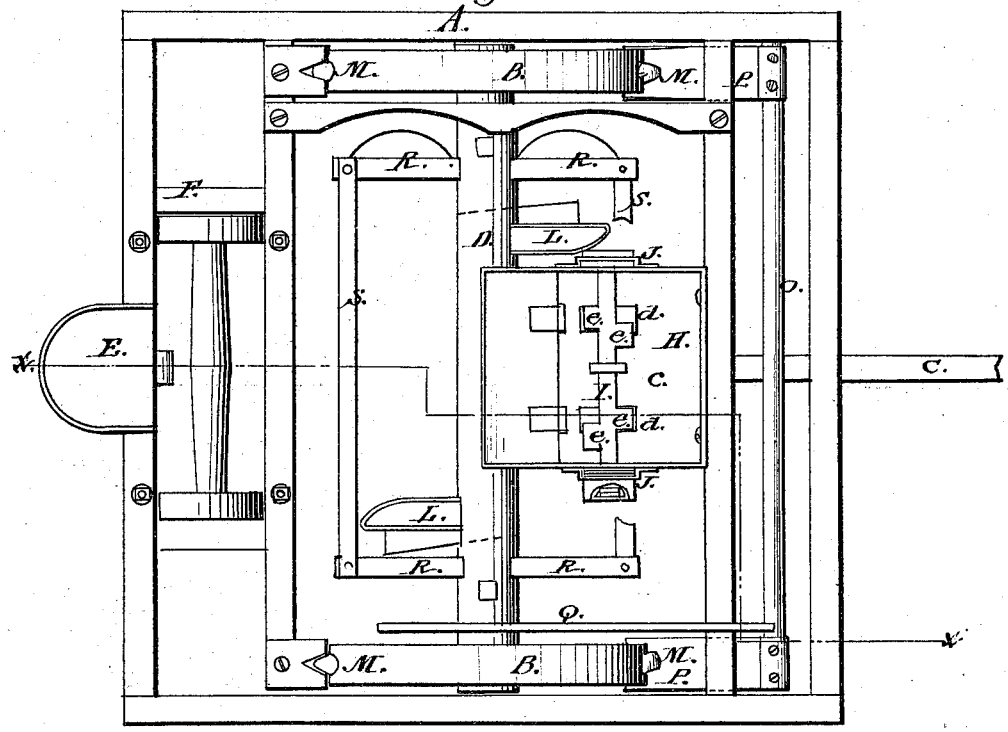
Witnesses:
Theo. Tusche
W. Fraun
Inventor:
Geo. Paddington
by Munn & Co.
Attys

GEORGE PADDINGTON, OF SPRINGVILLE, IOWA.

Letters Patent No. 87,426, dated March 2, 1869.

IMPROVEMENT IN SEEDING-MACHINES.

The Schedule referred to in these Letters Patent and making part of the same.

*To all whom it may concern:*

Be it known that I, GEORGE PADDINGTON, of Springville, in the county of Linn, and State of Iowa, have invented a new and improved Agricultural Machine; and I do hereby declare that the following is a full, clear, and exact description thereof, which will enable others skilled in the art to make and use the same, reference being had to the accompanying drawings, forming part of this specification.

This invention relates to a new and improved machine for planting corn.

The invention consists in a peculiar construction of the machine, as hereinafter fully shown and described, whereby a very simple, efficient, and economical device for the above-named purpose is obtained.

In the accompanying sheet of drawings—

Figure 1 is a side sectional view of my invention, taken in the line $x\ x$, fig. 2.

Figure 2, a plan or top view of the same.

Similar letters of reference indicate corresponding parts.

A represents the frame of the machine, which is mounted on two wheels, B B, and has a draught-pole, C, attached.

The wheels B B are permanently secured on their axle, D, the latter being fitted in suitable bearings, so that it may turn freely, the wheels being within or at the inner sides of the side pieces of the frame A, as shown clearly in fig. 2.

On the rear part of the frame A, the driver's seat E is placed, and the rear part of the frame is supported by a truck, F, the frame G of which is connected to the frame A by rods, *a*, which have spiral springs, *b*, on them within the frame A. This admits of an easy movement of the frame A as the machine is drawn along.

H represents a seed-box, or hopper, which is secured within the front part of the frame A, and has its bottom, *c*, perforated with holes, *d*, over which cut-offs, *e e*, work, the latter being on a slide, I, the ends of which extend through the sides of the seed-box, or hopper, and are connected to bars, J J, the upper ends of which are secured to the sides of the hopper, near its upper part, and are connected at their lower ends by a slide, K, precisely similar to I, and provided with cut-offs *e'*, and so arranged, that when the cut-offs *e* of the slide I are off from the holes *d*, the lower cut-offs *e'* of slide K will cover them, and *vice versa*, the holes *d*, in bottom *c*, forming seed-cells, and measuring each discharge.

These slides are operated by two arms, L L, which are attached to the axle D, and project from it at opposite sides.

These arms are rounded at their outer parts, and they act, as the machine is drawn along, alternately against the bars J J, and a reciprocating movement given the slides, the length of the movement of the slides being regulated, as desired, by adjusting the arms L further in or out from the axle D.

The peripheries of the wheels B have projections, M, attached, to serve as markers, and the two coverers N N are attached to the rear part of the seed-box, and have such a relative position with the seed-discharge openings in the bottom of the hopper, that the seed or corn will be covered with certainty.

In the front part of the frame A, there is placed a shaft, O, having plates, P, attached, one in line with each wheel B.

This shaft O is allowed to turn freely in its bearings, and it has a lever, Q, attached, by actuating which the plates P may be pressed against the peripheries of the wheels, and the latter prevented from revolving when the machine is being turned or adjusted at the ends of rows.

This is important, in order that the projections or markers M, on the peripheries of the wheels B, may always be kept in a proper relative position with the seed-discharging device.

The axle D may be provided with radial arms R, to which knives, or cutters, S, are attached, when the device is to be used for cutting standing corn.

These knives, or cutters, are parallel with the axle, and the arms R of such a length that the knives, or cutters, will, as the machine is drawn along, cut down the standing corn.

It is designed to have the knives, or cutters S, attached to the arms R, in such a manner that they may be readily detached when not required for use.

The seed-box or hopper H is always detached when the device is to be used for cutting standing corn.

I claim as new, and desire to secure by Letters Patent—

1. The arrangement of the arms L upon opposite sides of the axle D, with relation to the seed-slides I K, whereby the slides are operated directly from the axle, without intermediate gears or levers, as herein shown and described.

2. The brakes or plates P, attached to the shaft O, in the front part of the frame A, substantially as and for the purpose specified.

3. The truck F, supporting the rear of the frame beneath the seat E, and consisting of the frame G, the wheels, and the rods *a*, provided with springs *b*, inserted in the frame, all arranged as herein shown and described.

The above specification of my invention signed by me, this 6th day of September, 1867.

GEORGE PADDINGTON.

Witnesses:
 DAVID L. PALMER,
 ISAAC N. WOOD.